United States Patent [19]

Love et al.

[11] Patent Number: 4,930,590

[45] Date of Patent: Jun. 5, 1990

[54] MOTOR AND TRANSMISSION ASSEMBLY

[75] Inventors: Mahlon L. Love, Geneseo; Daniel L. Leemans, Moline, both of Ill.

[73] Assignee: Deere & Company, Moline, Ill.

[21] Appl. No.: 350,669

[22] Filed: May 11, 1989

[51] Int. Cl.⁵ .............................................. B60K 7/00
[52] U.S. Cl. .................................. 180/55; 180/65.5; 180/65.6; 180/308
[58] Field of Search .................... 180/65.5, 65.6, 65.7, 180/68.1, 55, 60, 308; 74/750 R, 751; 310/67

[56] References Cited

U.S. PATENT DOCUMENTS

| | | | |
|---|---|---|---|
| 3,812,928 | 5/1974 | Rockwell et al. | 180/65.5 |
| 3,897,843 | 8/1975 | Hapeman et al. | 180/65.5 |
| 4,330,045 | 3/1982 | Myers | 180/65.5 |
| 4,799,564 | 1/1989 | Iijima et al. | 180/65.6 |

Primary Examiner—Charles A. Marmor
Assistant Examiner—Richard M. Lamby

[57] ABSTRACT

A combined motor and transmission assembly in which a singular, tubular housing contains the motor and a planetary transmission. This tubular housing has the ring gear for the planetary transmission gear set formed integrally within its internal walls and also directly supports on its external wall a member driven by the planetary transmission.

7 Claims, 1 Drawing Sheet

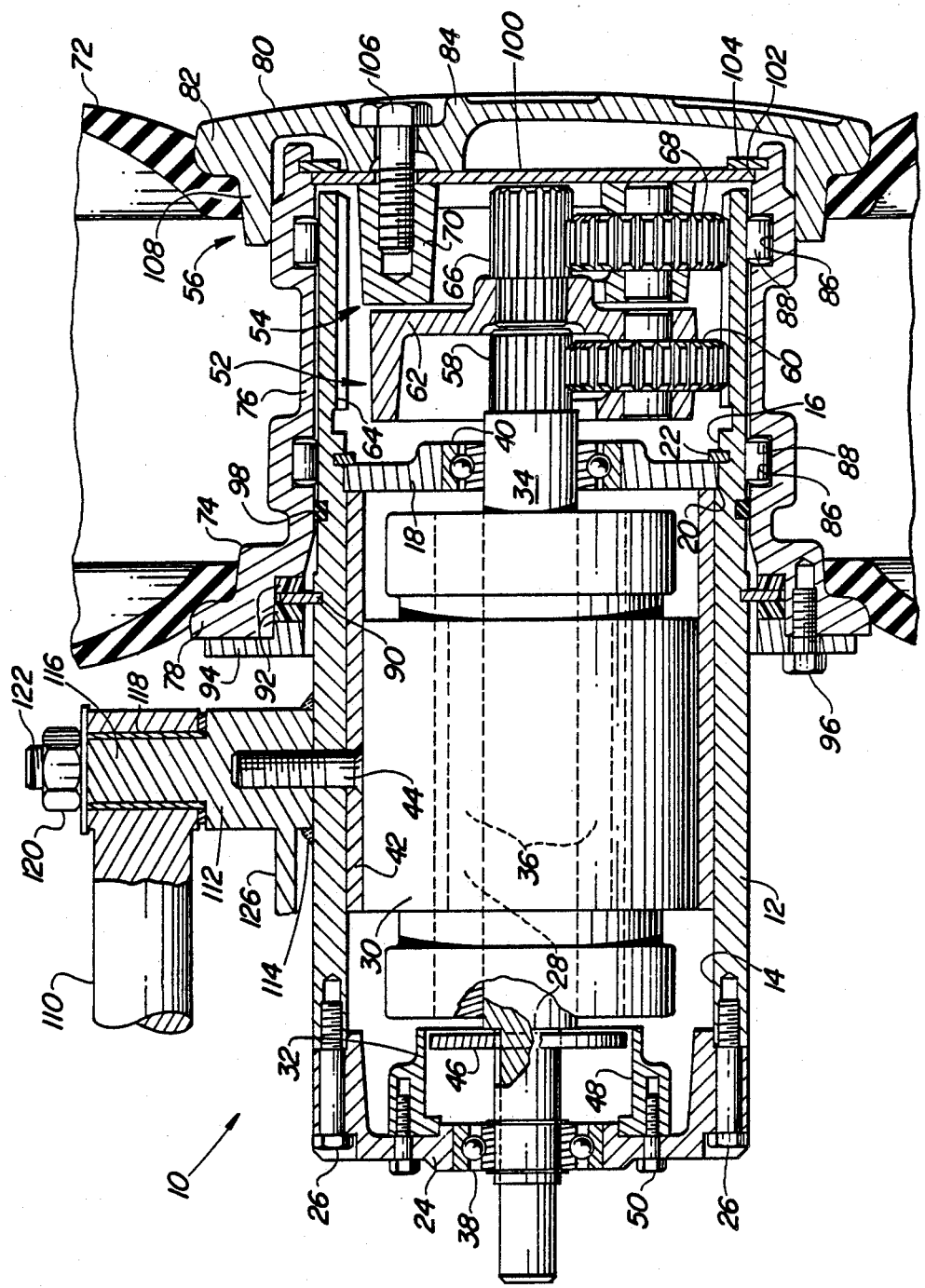

MOTOR AND TRANSMISSION ASSEMBLY

BACKGROUND OF THE INVENTION

1. Field of the Invention

The present invention relates to a combined motor and transmission assembly and more specifically relates to a simple and compact assembly which has a one-piece tubular housing for the motor and transmission and in which the housing also has the ring gear for the planetary transmission or planetary gear set formed integrally within its walls. In its preferred embodiment the invention will be described as a motor and transmission drive for individually driven wheels on a motor vehicle.

2. Prior Art

In the typical prior art wheel motor transmission units, the housings for the motor and transmission are typically separate parts welded or bolted together and even then each are made of a number of parts bolted together. The large number of parts provides a high cost machine and creates tolerance buildup problems in the manufacture of the assembly.

SUMMARY OF THE INVENTION

The principal object of the present invention is to provide an extremely compact and simplified motor and transmission assembly for a driven member.

A more specific object of the invention is to provide a compact motor and transmission unit for a driven element in which a singular tubular member provides the housing for both the motor and a planetary transmission and in which the singular tubular member also has the ring gear for the planetary transmission formed integrally on its inner surface and the driven member is rotatably mounted on the external surface thereof.

The above objects and other objects and advantages of the invention will become apparent to those skilled in the art from a reading of the following detailed description of the preferred embodiment of the invention when taken in conjunction with the accompanying drawing:

BRIEF DESCRIPTION OF THE DRAWING

The sole drawing figure is a cross sectional view of a motor and transmission wheel drive assembly which incorporates the principals of the present invention.

DESCRIPTION OF THE PREFERRED EMBODIMENT

In the drawing, the numeral 10 is a general reference to a combined motor, transmission and driven member or wheel hub assembly which is constructed in accordance with the present invention. The assembly 10 centers around a tubular housing 12 which is divided into a motor chamber 14 and a gearing chamber 16 by an annular bulkhead plate 18. The bulkhead plate 18 is shrink fit into the tubular housing and is held against axial movement by a shoulder 20 formed on the interior wall of the tubular housing and a snap ring 22. The motor chamber is closed by an end cap 24 which is secured to the end of the tubular housing by screws 26.

An electronically commutated permanent magnet motor is housed within the motor chamber 14 and includes a rotor 28, stator 30, and a position sensor 32 which drives appropriate electronic switching circuitry (not shown) for energizing appropriate windings. The rotor consists of a shaft 34 and multiple magnet poles 36 mounted on the shaft. The shaft 34 is rotatably supported in bearings 38 and 40 carried in the end cap 24 and bulkhead 18, respectively. The end of the shaft 34 extends beyond the bearing 40 into the gearing chamber 16. The bearing 40 is preferably a shielded bearing to seal between the two chambers.

The stator 30 is a multiple-slotted stator having a multiple-phase armature winding placed in the discrete slots and is non-rotatably secured within a sleeve 42 which is non-rotatably secured within the housing 12 by screw 44. The position sensor 32 includes a disk 46 mounted on the shaft 34 and an annular member 48 secured to the end cap 24 by screws 50 and extending around the disk 46. The disk 46 carries magnets which indicate the position of the shaft 34 to sensors carried by annular member 48. The motor is not shown or described in detail since the particular type of motor used is not necessarily part of the invention. The motor could be a brush-type motor or even a hydraulic motor as opposed to electrical motor.

First and second planetary gear sets indicated generally as 52 and 54 are contained within the gearing chamber 16 and transfer power from the motor output shaft 34 to a driven member indicated generally as 56. The first planetary gear set 52 includes a sun gear 58 which, in the preferred embodiment of the invention, is formed integral on the end of the output shaft 34 which is positioned within the gearing chamber 16. The first planetary gear set also includes a plurality of planet gears 60 which are rotatably supported on a carrier 62 and meshed with the sun gear 58 and also with a ring gear 64. The ring gear 64 is integral with the housing 12 and consists of teeth cut into the internal wall of the housing 12. The carrier 62 of the first gear set 52 carries and drives a toothed shaft 66 which forms a sun gear for the second planetary gear set 54. The second planetary set 54 also includes a plurality of planet gears 68 rotatably supported on a carrier 70 and meshed with the sun gear 66 and the ring gear 64. The ring gear has long teeth so that it serves for both planetary gear sets.

In the preferred embodiment of the invention as disclosed in the drawing, each of the planetary gear sets uses the sun gear as an input and the carrier as an output providing a speed reduction. However, depending upon the application, it may be desirable to increase speed and in such case the carrier could act as the input and the sun gear act as an output.

In the preferred embodiment of the invention, the driven member 56 takes the form of a two-piece wheel for supporting a tire shown partially at 72. One part of the wheel 74 forms the web 76 and one flange 78 of the wheel rim. The web 76 also forms the wheel hub. The other part 80 of the two-piece wheel forms the second flange 82 of the wheel rim and also a wheel cap 84. The internal surface of the web and hub 76 is provided with a pair of spaced annular grooves or bearing races 86 which are filled with a plurality of roller bearings 88. The external surface of the tubular housing 12 on the end thereof which forms the gearing chamber is ground to form inner bearing races which are engaged by the roller bearings 88 when the first wheel part 74 is positioned over the tubular housing.

The first wheel part is prevented from axial movement on the tubular housing 12 by a snap ring 90 engaged in a groove in the external surface of the housing 12. The snap ring is sandwiched between a pair of plastic rings 92 which may be formed of any suitable plastic material, but preferably one which resists wear and has anti-friction properties. One of the plastic rings 92 is positioned between the snap ring 90 and a shoulder on the driven member 56 while the other plastic ring 92 is positioned between the snap ring 90 and an annular plate 94 which is secured to the flange 78 by cap screws 96. A suitable seal 98 is held in a groove provided in the external wall of the tubular housing 12 and acts between the housing 12 and the hub of the driven member to protect the bearings and gears from contaminants which may otherwise enter between the housing 12 and hub of the driven member.

A drive plate 100 is press-fit into the open end of the first wheel member opposite from the flange 98 and is held in axial position by being captured between a shoulder 102 formed on the internal surface of the first wheel member 74 and a snap ring 104 held in a groove provided in the internal surface of the first wheel member 74. The second wheel member 80 is secured to the carrier 70 of the second planetary gear set 54 by a plurality of cap screws 106. The cap screws 106 also extend through suitable apertures provided in the drive plate 100 which is clamped between the second wheel part 80 and the carrier 70. The second wheel part further includes an annular lip 108 which is wedged over the web or hub 76 of the first wheel part as the cap screws 106 are tightened to draw the second wheel part 80 against the plate 100. The plate 100 and second wheel part 80 serve to position the carrier 70 of the second planetary gear set 54 with respect to the first wheel part 74. Power is transferred from the carrier 70 of the second planetary gear set 54 directly to the second wheel member 80 by the cap screws 106 and to the first wheel part 74 through friction fit between the drive plate 100 and the first wheel part 74 and also through the friction fit of the lip 108 of the second wheel part 80 and the first wheel part 74. If desired, a more positive drive to the first wheel part 74 could be obtained by suitable pins acting between the drive plate 100 and the first wheel part 74 and/or the second wheel part 80 and first wheel part 74 or by other means such as mating teeth and slots between the drive plate 100 and first wheel part 74. Also, if the two-part wheel is to be used with tubeless tires, a suitable seal could be positioned between the lip 108 of the second wheel part and the surface of the first wheel part 74.

For the purpose of mounting the motor/gear set/wheel assembly to an axle 110 of a vehicle, a post 112 is rigidly secured to the tubular housing 12 closely adjacent to the driven member 56 but spaced sufficiently to clear the tire 72. The post 112 is initially secured to the housing 112 by the screw 44 and then rigidly attached by welding 114. A central portion 116 of the post 112 extends through a bushing 118 positioned in an aperture in the end of the axle 110. The post 112 is held within the bushing by a nut 120 threaded onto the threaded upper end 122 of the post 112. The nut 120 bears against a washer 124 which sits on the outer end of the axle. The post 112 is also provided with a steering arm shown partially at 126.

From the foregoing description of the preferred embodiment, it can be seen that the use of a single piece tubular housing serves multiple functions. It provides the housing for both the motor and the planetary gear sets, it serves as the ring gear for both planetary gear sets, it serves directly as the mount for the driven member, and is also used as the direct mount to the end of the axle 10. This multi-function use of the single piece housing provides a very compact assembly, provides an assembly which is relatively easy and inexpensive to manufacture, and avoids any problem with buildup of tolerances which often occurs when multiple parts are used.

Other features and advantages of the preferred embodiment of the invention will be apparent to those skilled in the art from a reading of the foregoing detailed description of the preferred embodiment of the invention. However, the invention should not be limited to such preferred embodiment, but only by the following claims.

I claim:

1. A combined drive motor and gearing unit comprising:
   a single piece housing divided into a motor chamber and a gearing chamber by a bulkhead;
   a motor in the motor chamber having an output shaft extending into the gearing chamber through an opening provided in the bulkhead;
   a planetary reduction gear system in the gearing chamber including at least one sun gear, at least one planet carrier, a ring gear formed on the internal surface of the housing as an integral part thereof, and a plurality of planet gears carried by the at least one carrier and meshing with the at least one sun gear and the ring gear;
   one of the at least one sun gear and at least one carrier being driven by the motor output shaft to provide the input to the planetary system and another providing the planetary output;
   a driven member secured to the planetary output for rotation therewith and including a portion encircling at least a portion of the gearing chamber end of the housing; and
   bearing means acting between said portion of said driven member and said at least a portion of said gearing chamber end of said housing to rotatably support said driven member on said housing.

2. The combined drive motor and gearing unit set forth in claim 1 wherein a sun gear is integrally formed on the end of the motor output shaft positioned in the gearing chamber and provides the input to the planetary system and wherein the driven member is rigidly secured to a carrier such that it is driven by the carrier and radially positions the carrier.

3. The combined drive motor and gearing unit set forth in claim 2 wherein the portion of the driven member encircling the at least a portion of the gearing chamber end of the housing is provided with spaced internal annular grooves forming outer bearing races, the external surface of the at least a portion of the gearing chamber end of the housing is of smooth, circular configuration and forms inner bearing races, the bearing means includes a plurality of rollers seated in the outer bearing races and engaging the inner bearing races, and means are provided to prevent axial movement of the driven member whereby the driven member also axially positions the carrier to which it is attached.

4. A combined support, drive motor and gearing unit comprising:
   a single piece, substantially cylindrical, hollow housing divided into a motor chamber and a gearing chamber by a bulkhead;
   a motor in the motor chamber having an output shaft extending into the gearing chamber through an opening provided in the bulkhead;
   a planetary gear system in the gearing chamber including first and second planetary gear sets each including a sun gear, a ring gear, a planet carrier, and a plurality of planet gears carried by the carrier and meshing with the sun and ring gears;

the ring gear of each of the first and second gear sets being formed in the internal wall of the gearing chamber of the housing;

one of the sun gear and planet carrier of the first gear set being secured to the motor output shaft to provide a planetary input;

the other of the sun gear and planet carrier of the first gear set being secured to one of the sun gear and planet carrier of the second gear set;

the other of the sun gear and planet carrier of the second gear set providing a planetary output;

a driven member secured to the planetary output for rotation therewith and including a portion encircling at least a portion of the gearing chamber portion end of the housing; and bearing means between said portion of said driven member and said at least a portion of the gearing chamber end of said housing to rotatably support said driven member on said housing.

5. The combined support, motor and gearing unit as set forth in claim 4 wherein the portion of the driven member encircling the at least a portion of the gearing chamber end of the housing is provided with first and second spaced internal grooves forming a pair of spaced, outer bearing races, the external surface of the at least a portion of the gearing chamber end of the housing forms first and second spaced, inner bearing races, and the bearing means includes a plurality of roller bearings seated in the outer races and engaging the inner races.

6. The combined support, motor and gearing unit as set forth in claim 4 wherein the sun gear of each planetary gear set provides the input and the carrier of each planetary gear set provides the output, the ring gears of the first and second planetary gear sets are formed by common internal and elongated gear teeth formed on the internal wall of the gearing chamber of the housing, the portion of the driven member encircling the at least a portion of the gearing chamber end of the housing is provided with first and second spaced internal grooves forming a pair of spaced, outer bearing races, the external surface of the at least a portion of the gearing chamber end of the housing forms first and second spaced, inner bearing races, and the bearing means includes a plurality of roller bearings seated in the outer races and engaging the inner races.

7. A combined support, motor and gearing unit comprising:

a single piece tubular housing;

a bulkhead plate fixed inside said housing and dividing said housing into a motor chamber and a gear chamber, the bulkhead having a central opening supporting first bearing means;

a cap secured to the housing to close the open end of the motor chamber;

second bearing means supported by the cap;

a motor in the motor chamber having an output shaft journaled in the first and second bearing means and extending into and terminating in the gear chamber;

first and second planetary gear sets in said gear chamber;

each gear set including a sun gear, a planet carrier and a plurality of planet gears rotatably supported by the carrier and meshing with the sun gear;

said first and second gear sets further including a common ring gear formed by gear teeth cut in the housing internal wall and meshing with the planet gears;

the sun gear of the first gear set being fixed with respect to the motor output shaft to provide the input of the first gear set;

the sun gear of the second gear set being fixed to the carrier of the first gear set to provide the input of the second gear set;

a driven member rotatably supported on the external surface of the gear chamber end of the housing;

means preventing movement of the driven member axially of the housing; and the driven member including a portion fixed to the carrier of the second gear set.

* * * * *